(12) United States Patent
Wilson

(10) Patent No.: US 10,750,722 B2
(45) Date of Patent: Aug. 25, 2020

(54) LEASH ENGAGEABLE CARRIER FOR STORAGE

(71) Applicant: Beverly Wilson, Stuart, FL (US)

(72) Inventor: Beverly Wilson, Stuart, FL (US)

( * ) Notice: Subject to any disclaimer, the term of this patent is extended or adjusted under 35 U.S.C. 154(b) by 199 days.

(21) Appl. No.: 16/115,401

(22) Filed: Aug. 28, 2018

(65) Prior Publication Data

US 2019/0059334 A1 Feb. 28, 2019

Related U.S. Application Data

(60) Provisional application No. 62/551,103, filed on Aug. 28, 2017.

(51) Int. Cl.
*A01K 27/00* (2006.01)
*A45C 15/00* (2006.01)

(52) U.S. Cl.
CPC ............ *A01K 27/008* (2013.01); *A45C 15/00* (2013.01)

(58) Field of Classification Search
CPC .... A01K 27/008; A01K 27/00; A01K 27/003; A01K 27/004; A01K 27/005; A01K 27/006; A01K 27/001; A01K 27/002; A45C 15/00
See application file for complete search history.

(56) References Cited

U.S. PATENT DOCUMENTS

| | | | | |
|---|---|---|---|---|
| 5,233,942 A * | 8/1993 | Cooper | ............... | A01K 27/008 119/792 |
| 5,441,017 A * | 8/1995 | Lindsay | ............... | A01K 27/003 119/161 |
| 5,718,192 A * | 2/1998 | Sebastian | ............. | A01K 27/006 119/795 |
| 5,950,571 A * | 9/1999 | Schade | ................ | A01K 27/006 119/859 |
| 6,019,067 A * | 2/2000 | Carey | .................. | A01K 27/006 119/795 |
| 6,085,695 A * | 7/2000 | Miller | .................. | A01K 27/006 119/795 |
| 8,353,603 B2 * | 1/2013 | Berry | ................... | A01K 27/006 362/154 |
| 9,386,841 B2 * | 7/2016 | Labadini | ................... | A45F 5/00 |
| 9,861,078 B1 * | 1/2018 | Mantelli | .............. | A01K 27/008 |
| 2003/0111022 A1 * | 6/2003 | Woolley | ............... | A01K 27/004 119/868 |
| 2006/0231043 A1 * | 10/2006 | Galdo | .................. | A01K 27/008 119/796 |
| 2009/0205585 A1 * | 8/2009 | La Herran | ........... | A01K 27/006 119/795 |
| 2015/0053145 A1 * | 2/2015 | Miksovsky | .......... | A01K 27/003 119/772 |
| 2016/0135432 A1 * | 5/2016 | Cox | ..................... | A01K 27/008 119/795 |
| 2017/0112103 A1 * | 4/2017 | Iles | ....................... | A01K 27/005 |

(Continued)

*Primary Examiner* — Trinh T Nguyen

(74) *Attorney, Agent, or Firm* — Donn K. Harms

(57) ABSTRACT

A leash engageable carrier for personal items of a user walking with a pet connected to a leash. The carrier has an elongated cylindrical body formed by a sidewall which surrounds the leash. The body is adapted for sliding engagement on a leash passing through an interior cavity and openings at opposite ends of the body. An interior cavity defined by said sidewall is accessible while the body is engaged with the leash through an opening communicating through the sidewall which has a closure.

6 Claims, 6 Drawing Sheets

(56) References Cited

U.S. PATENT DOCUMENTS

| | | | |
|---|---|---|---|
| 2017/0233170 A1* | 8/2017 | Badurina | B65F 1/1623 |
| | | | 242/557 |
| 2019/0373861 A1* | 12/2019 | Jirsa | A01K 27/005 |

\* cited by examiner

LEASH ENGAGEABLE CARRIER FOR STORAGE

This application claims priority to U.S. Provisional Patent Application Ser. No. 62/551,103, filed on Aug. 28, 2017, which is incorporated herein in its entirety by this reference thereto.

FIELD OF THE INVENTION

The present device relates to leashes frequently employed when walking pets. More particularly, the device herein relates to a leash-engageable or engaged elongated cylindrical carrier which is adapted for holding personal effects such as keys and identification. The carrier is adapted for leash engagement in a surrounding positioning upon the leash in an inconspicuous manner. The device so engaged is configured within an interior cavity to carry pet waste and containers for such.

BACKGROUND OF THE INVENTION

A joint walk is one of the favorite things pet owners enjoy, as do their pets. It is well known, especially for dogs, that daily walks serve to bond the animal with the owner walking them as well as providing exercise to both participants.

One problem which arises for pet owners, wanting to share a leisurely walk with their pet, is where to store both personal and pet items during the walk. Carrying a purse or bag with personal items in it is not conducive to being able to run or walk quickly while exercising a pet. This is because carrying personal items while holding a leash connected to a pet becomes uncomfortable over time if the walk is extended.

Additionally, a carried purse or bag in a public area becomes a target for thieves and the like. Further, if a purse or bag is brought along most people tend to employ purses or bags which are already loaded with personal items and as such become more bulky when pet related items are included.

Still further, in most countries, it is expected or legally required that pet owners will pick up after their pet has left their mark on pavements, lawns, and the like. Retrieval of pet droppings generally entails the use of a plastic bag or container to retrieve the deposit left by their pet. The bag which is sealed with its contents must then be taken home for disposal.

Most pet owners would rather not carry too many personal items to reduce the weight and bulk of what they carry, as well as the risk of having such items taken in a theft. Further, once a plastic bag has been filled with that which has been left by their pet, most pet owners would rather not place a bag with such contents in their purse or pocket.

The device herein disclosed is configured for engagement with a leash in a surrounding positioning of the body of the device with the leash. It is formed in a slim configuration in such an engagement to a leash, thereby providing a stealth container for personal items, as well as a dedicated holder for pet droppings which have been retrieved into plastic containers by responsible pet owners.

The forgoing examples of the issues relating to the art of containers for use when pet walking and the limitations related therewith are intended to be illustrative and not exclusive. The disclosed examples and background does not imply any limitations on the invention described and claimed herein. Various other limitations of the related art in portable holders of personal and pet items are known, or such will become apparent to those skilled in the art upon a reading and understanding of the specification below and the accompanying drawings.

SUMMARY OF THE INVENTION

The device and system herein disclosed and described provides a solution to the shortcomings in prior art of portable containers for carrying personal and pet items. The device features an elongated body adapted for engagement encircling a pet leash. The body of the device, in all modes, is configured in a size and shape, that once operatively engaged around the pet leash, is inconspicuous to others. Thus, the device, in use, provides a stealth holder for personal items, as well as a leash-engaged container for pet related products such as plastic bags, both empty and filled.

The device features a generally flexible body formed of flexible material and has opposing end passages which are configured to compress around a leash with elastic or the like positioned therein. An elongated opening communicates through the flexible material forming a sidewall of the device. This opening is positioned to provide access to the majority of an internal storage cavity within the elongated body. This opening has a user operable closure which allows it to be easily opened and securely closed during use while the device is engaged to surround a leash. A closure to removably engage the two opposing portions of sidewall of the device, such as a zipper, hook and loop fabric, snaps, hooks, buttons, or other means for temporarily securing the opening in a closed configuration, allows the user to easily access the interior cavity for placing items therein, and retrieving items from the elongated storage cavity.

The body of the device may be located to an engaged position where it will encircle any leash, in a position on a central portion of a leash, in-between the grip end held by the user, and the distal end of the leash which is connected to the collar of a pet such as a dog. Such is accomplished by threading the leash through a first passage at one end of the body, through the interior cavity, and to an exit at a second passage at the opposite end from the first passage. A flexible conduit may communicate between the first passage and the second passage to provide a pathway for the leash in some mode of the device. Alternatively, the interior cavity itself may define the pathway for the leash in modes of the device without the flexible conduit.

In use, the owner can place their personal items such as phones, wallets, eyewear, and the like within the interior cavity. The user can also position pet related items such as plastic bags, prior to use and after use, within the interior cavity. The small diameter of the interior cavity, and the compressive elastic engagement of the body at both ends to the leash, renders the elongated body of the device, once engaged around a leash to the engaged position, inconspicuous to third parties.

With respect to the above description, before explaining at least one preferred embodiment of the leash engageable carrier disclosed and described herein in detail, it is to be understood that the invention is not limited in its application to the details of construction and to the arrangement of the components in the following description or illustrated in the drawings. The leash engageable container invention herein described and shown is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other inconspicuous containers adapted for positioning on a leash, and for carrying out the several purposes of the present disclosed device. It is important, therefore, that the claims be regarded as including such equivalent construction and methodology insofar as they do not depart from the spirit and scope of the present invention.

It is an object of the present invention to provide a container for personal items and pet related items, which is configured for engagement upon a leash.

It is an additional object of this invention to provide such a leash engageable container which is configured to be small in diameter and therefor inconspicuous once engaged to surround a portion of the leash.

It is a further object of this invention to provide such a leash engageable container which is configured with a leash pathway through the interior cavity of the body of the device which allows for an easy threading of the leash or lanyard used in combination herewith, through the device.

These and other objects, features, and advantages of the disclosed leash engageable container, as well as the advantages thereof over existing prior art, which will become apparent from the description to follow, are accomplished by the improvements described in this specification and hereinafter described in the following detailed description, which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive examples of embodiments and/or features of the disclosed leash engageable container. It is intended that the embodiments and figures disclosed herein in FIGS. 1-6 are to be considered illustrative of the invention herein, rather than limiting in any fashion.

DETAILED DESCRIPTION OF THE INVENTION

Figure 1:
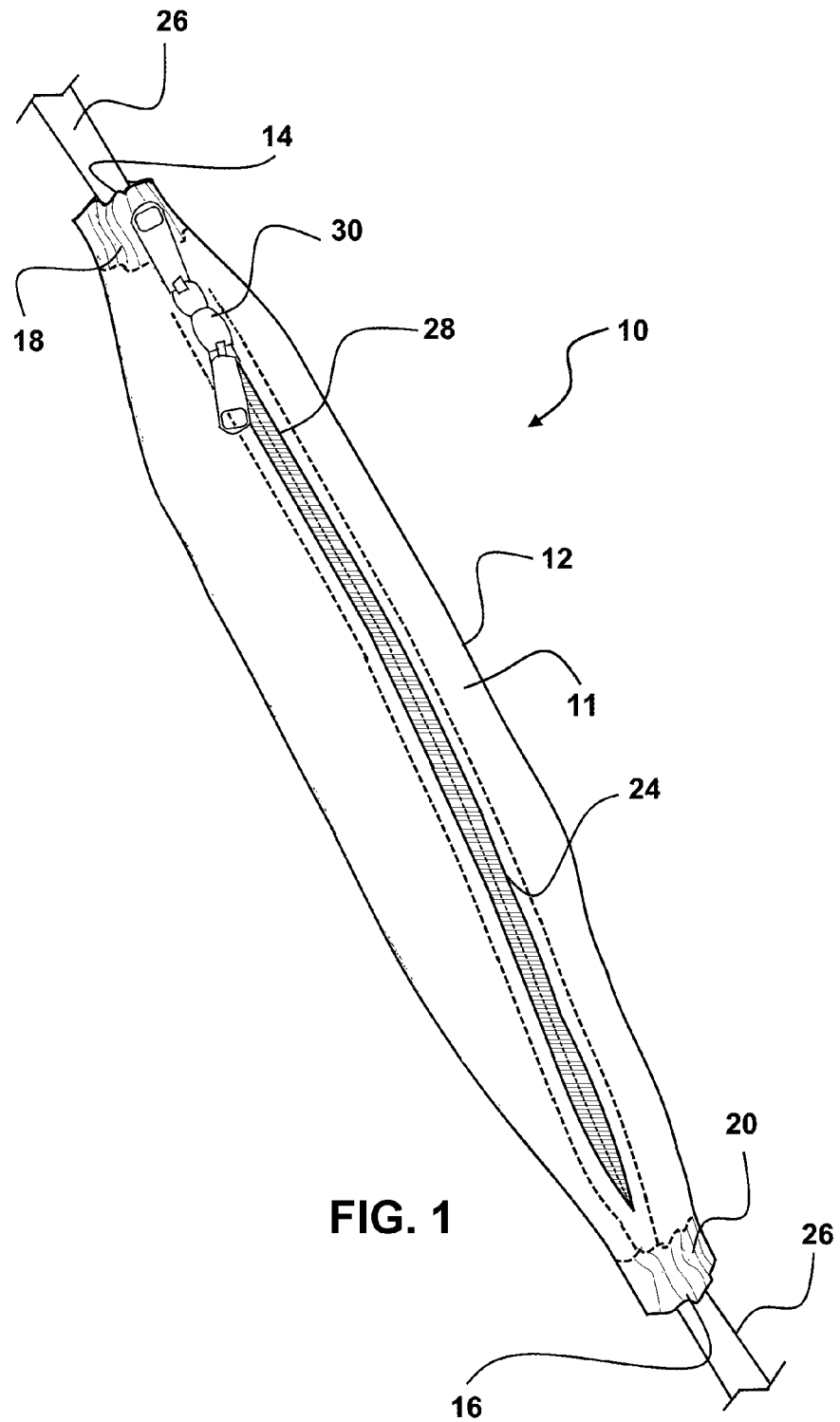
FIG. 1 depicts the leash engageable container shown in an engaged positioning upon a central portion of a pet leash, and shows the closure removably sealing an opening providing access to an interior cavity.

In this description, the directional prepositions of up, upwardly, down, downwardly, front, back, top, upper, bottom, lower, left, right and other such terms of direction or position, refer to the device as it is oriented and appears in the drawings and are used for convenience only, and such are not intended to be limiting or to imply that the device has to be used or positioned in any particular orientation.

Now referring to drawings in FIGS. 1-6, wherein similar components are identified by like reference numerals, there can be seen in FIG. 1 a depiction of the disclosed leash engageable container device 10 herein. The device 10 has a flexible elongated body 12 formed of flexible material such as woven or knitted fabric, leather, or other material adapted for sewing to form the cylindrical or tubular body 12 depicted.

As shown in FIG. 1, the body 12 is formed of a generally planar flexible sidewall 11 having a first passage 14 positioned at a first end, and a second passage 16 positioned at an opposite second end. The material forming the sidewall 11 of the body 12 at the first end is sewn or formed with elastic material or an elastic O-ring sewn into the sidewall 11 of the body to form a first biased portion 18 of the sidewall 11 defining the tubular body 12. This biased portion 18 compresses the first passage 14 to hold it substantially closed. By substantially closed, where used herein, is meant that a compressive contact of the sidewall 11 forming side surfaces defining the perimeter of the first passage 14 and the second passage 16 noted below. This compressive contact of the sidewall 11 forming the side surfaces of the perimeter of the first passage 14 and second passage 16, also forms a biased contact of the first passage 14 and second passage 16 against a leash 26 passing therethrough, or as noted below, a conduit 44 communicating therethrough. Thus, the body 12 is slidably engaged upon a leash running along the leash pathway through both passages 14 and 16 and held in position by the biased contact against the leash 26 or by a strap 48 (FIG. 4) where the conduit 44 (FIG. 4) is included, if the conduit 44 projects outside of the interior cavity 22.

A similar configuration is formed in the material forming the sidewall 11 defining the body 12 at the second passage 16 at the second end, which is also sewn with or formed of elastic material sewn into or as part of the sidewall 11 forming the body 12, to form a second biased portion 20 of the sidewall 11 defining the tubular body 12. This second biased portion 20 much like the first biased portion 18, as noted, compresses the sidewall 11 forming the second passage 16 to hold it substantially closed.

This compressive contact holding both passages 14 and 16 in a biased closed positioning helps keep dust, dirt, and rain from entering the internal cavity 22 (FIG. 2) during use. The compression provided by each of the first biased portion 18 and second biased portion 20, thus keeps out contaminants and concurrently forms a compressive engagement with a leash 26 or lanyard or flexible conduit 44 which passes through the body 12 along a leash pathway communicating between the first passage 14 and second passage 16 through said interior cavity 22.

Figure 2:
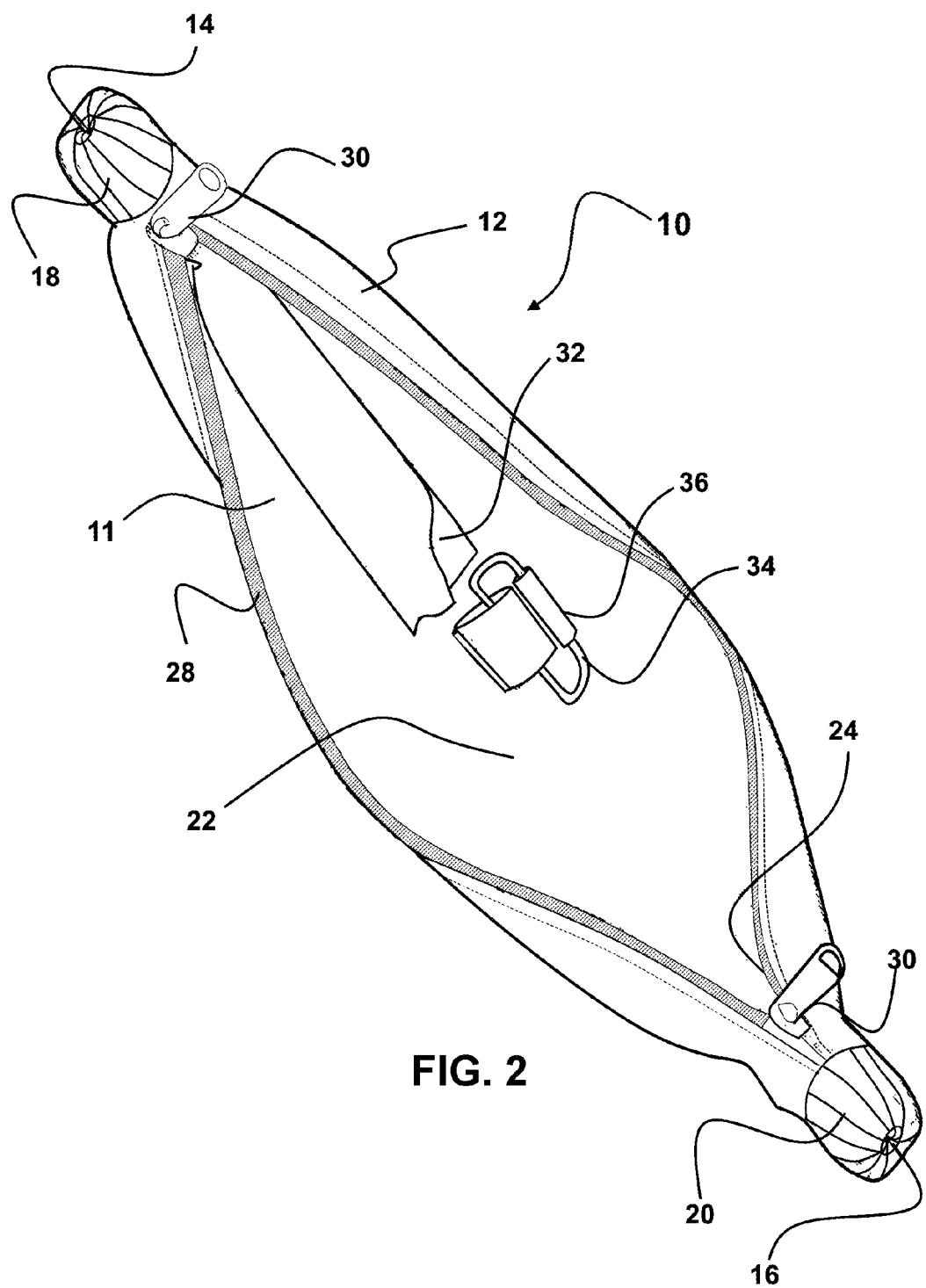
FIG. 2 depicts the device of FIG. 1, showing the interior cavity, and the leash pathway for a leash therethrough between opposing compressed first and second passages at opposing ends.

In the sidewall 11 of the body 12 which is shown in a closed configuration in FIG. 1, and open configuration in FIG. 2, there is positioned an elongated opening 24 which provides the user access to the interior cavity 22 of the body 12 of the device 10. This closeable opening 24 also allows the user to thread a leash 26 along a leash pathway through the interior cavity 22 running between the first passage 14, and the second passage 16. To place the device 10 in an engaged position shown in FIG. 1, the closure 28 removably sealing the opening 24 is opened. Thereafter the leash 26 is threaded along the leash pathway through the first passage 14, the interior cavity 22, and to an exit at the second passage 16.

The closure 28 of the opening 24 of the device 10 shown in FIGS. 1-6 herein, is shown using a zipper 30 to removably close the opening 24. However, any closure one skilled in the art might use is anticipated herein, such as any closure from a group of closures including zippers, hooks, buttons, snaps, hook and loop fabric, and magnets.

Shown in FIG. 2, is the body 12 with the closure 28 in an open configuration which provides the user access to the interior cavity 22 through the opening 24. As noted, the leash 26 may be threaded along a leash pathway through the interior cavity 22 between the first passage 14 and second passage 16, with the interior cavity 22 open. Further, with the closure 28 in an open configuration, the user can position personal items within the interior cavity 22, or within a pocket 32 at one end of the cavity. This pocket 32 when included, is accessible through a second opening 25 shown in FIG. 3.

Additionally, a connector 34 with a removably engageable sliding or threaded opener 36 may be provided for the user to engage keys or other personal items on the connector 34. Such a connector 36 generally exposes an gap (not shown) once the spring loaded and biased opener 36 is slid to one side of the underlying gap. Thus, items such as keys may be removably secured to the connector 34 once passed through the gap whereupon the opener 36 is returned to close the gap in the connector 34.

The interior cavity 22 surrounded by the sidewall 11 defining the body 12, is also easily accessible through the opening 24 to dispense plastic bags therefrom for retrieval of pet deposits during a walk, and storage therein of filled plastic bags for the duration of the walk. The biased closed first passage 14 and second passage 16 ensure that the plastic bags, and anything else placed within the interior cavity 22, remain there and do not exit through either passage. Additionally, malodorous scents from the contents placed within the interior cavity 22 are also maintained therein by the biasing closure of the first and second passages 14 and 16 forming opposing seals which bias against the leash 26 passed therethrough, or opposing ends of the conduit 44. This sealed engagement at both ends of the body 12 provides utility in maintaining odors within the interior cavity 22 which the user, as well as those accompanying the user, will value.

Figure 3:
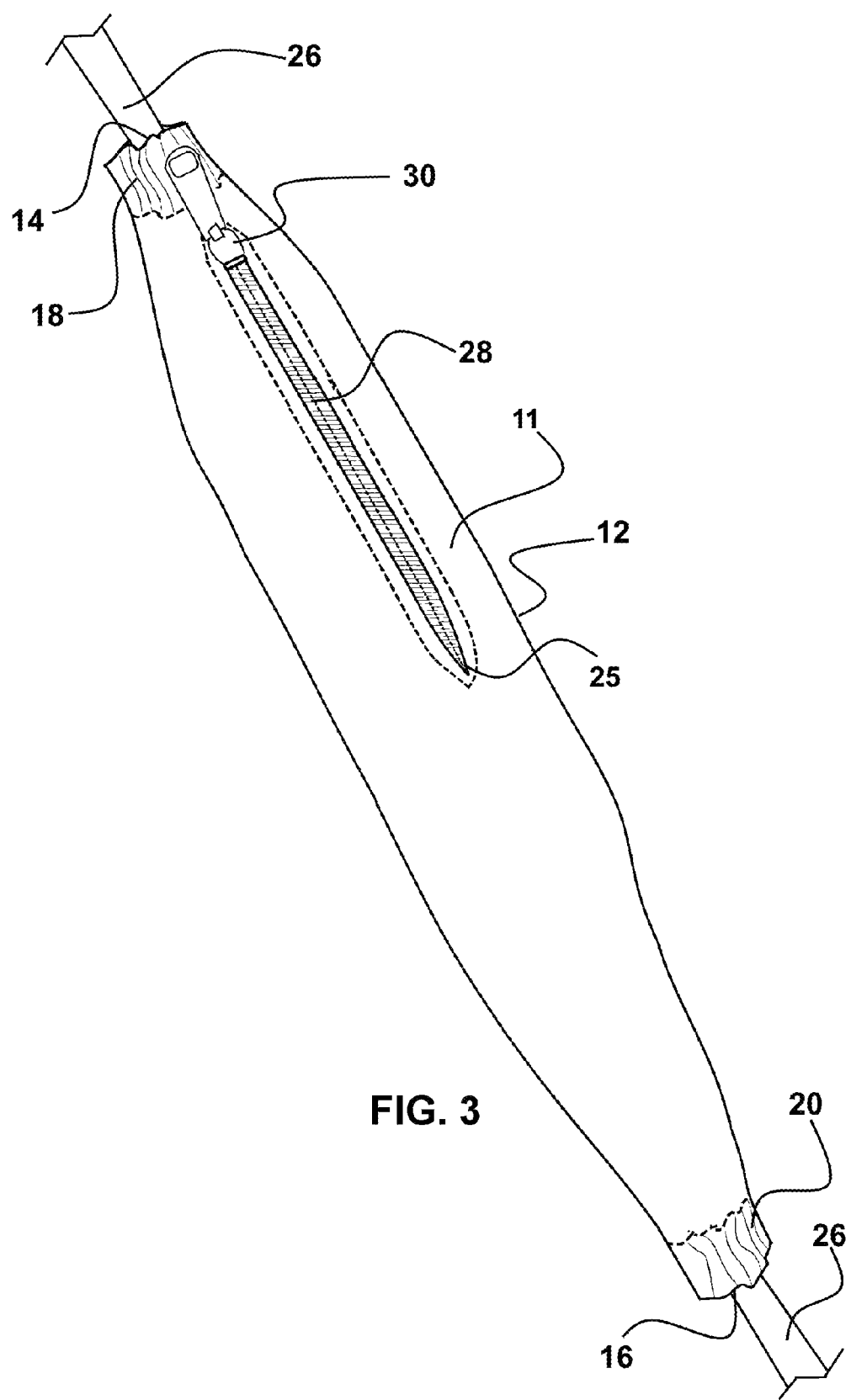
FIG. 3 depicts a rear view of the leash engageable container of FIG. 1 showing the zippered second opening providing access to a pocket located in the interior cavity.

Shown in FIG. 3 is a rear view of the leash engageable container of FIGS. 1-6, showing a closure 28 such as a zipper holding a second opening 25 which provides access to the pocket 32 in the interior cavity 22, or the interior cavity 22. The shown closure 28 is opened and closed using a zipper 30, however other closures 28 could be employed such as hook and loop fabric or fasteners.

Figure 4:
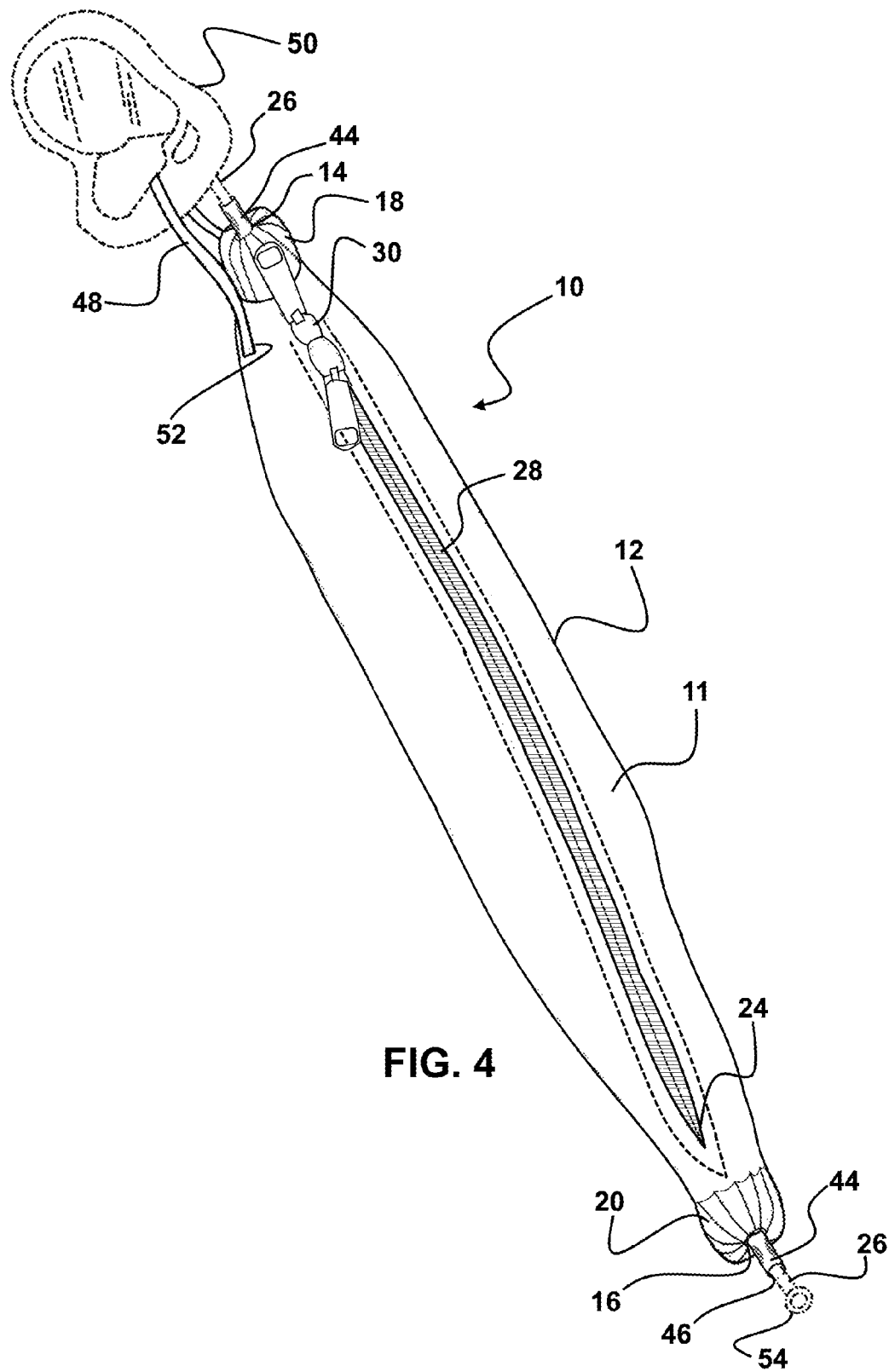
FIG. 4 depicts another mode of the leash engageable container herein similar to that of FIG. 1 wherein a flexible conduit is included for the leash pathway through the interior cavity between opposing first and second ends and also depicts a strap adapted to connect with a leash handle.

FIG. 4 depicts a mode of the leash engageable container device 10 herein formed in the manner of that of FIG. 1, which includes a flexible conduit 44. The flexible conduit 44 may be formed from polymeric or similar material which has an axial passage 46 running therethrough. While depicted as exiting the body 12 and projecting from both the first passage 14 and second passage 16, it could formed to be positioned only within the interior cavity 22 and held in place by stitches or fasteners. However, experimentation has found that projecting from the body 12 allows for easier threading of a leash 26 through the body 12 with the axial passage 46 forming a wall surrounding the leash pathway.

The flexible conduit 44 when included thus constricts the size of the leash pathway through the interior cavity 22 to the area within the axial passage 46. Thus, a leash 26 runs along the leash pathway which is confined within the axial passage 46 within the interior cavity 22 between the first passage 14 to the second passage 16.

When the flexible conduit 44 is included, the body 12 is still adapted for a sliding engagement on a leash 26. However, a strap 48 may be provided which is adapted to connect with a leash handle 50 which is connected to one end of the leash 26 to hold the body 12 in a desired position on the leash 26 if the flexible conduit 44 is sufficiently stiff to not collapse and impart compression from the first biased portion 18 and second biased portion 20 to the leash 26. However, if the flexible conduit 44 is formed of a polymeric material which is soft and will compress inward when biased by the first and second biased portions 18 and 20 then sufficient compression against a leash 26 communicating through the axial passage 46 will allow the body 12 to be slid upon the leash to a desired position which will be held by the compression there against. A fastener 52 such as hook and loop fabric, a snap, or similar fastener 52 engages a removable end of the fastener 52 with the body 12 to allow the strap 48 to be engaged through or with leash handle 50.

Figure 5:
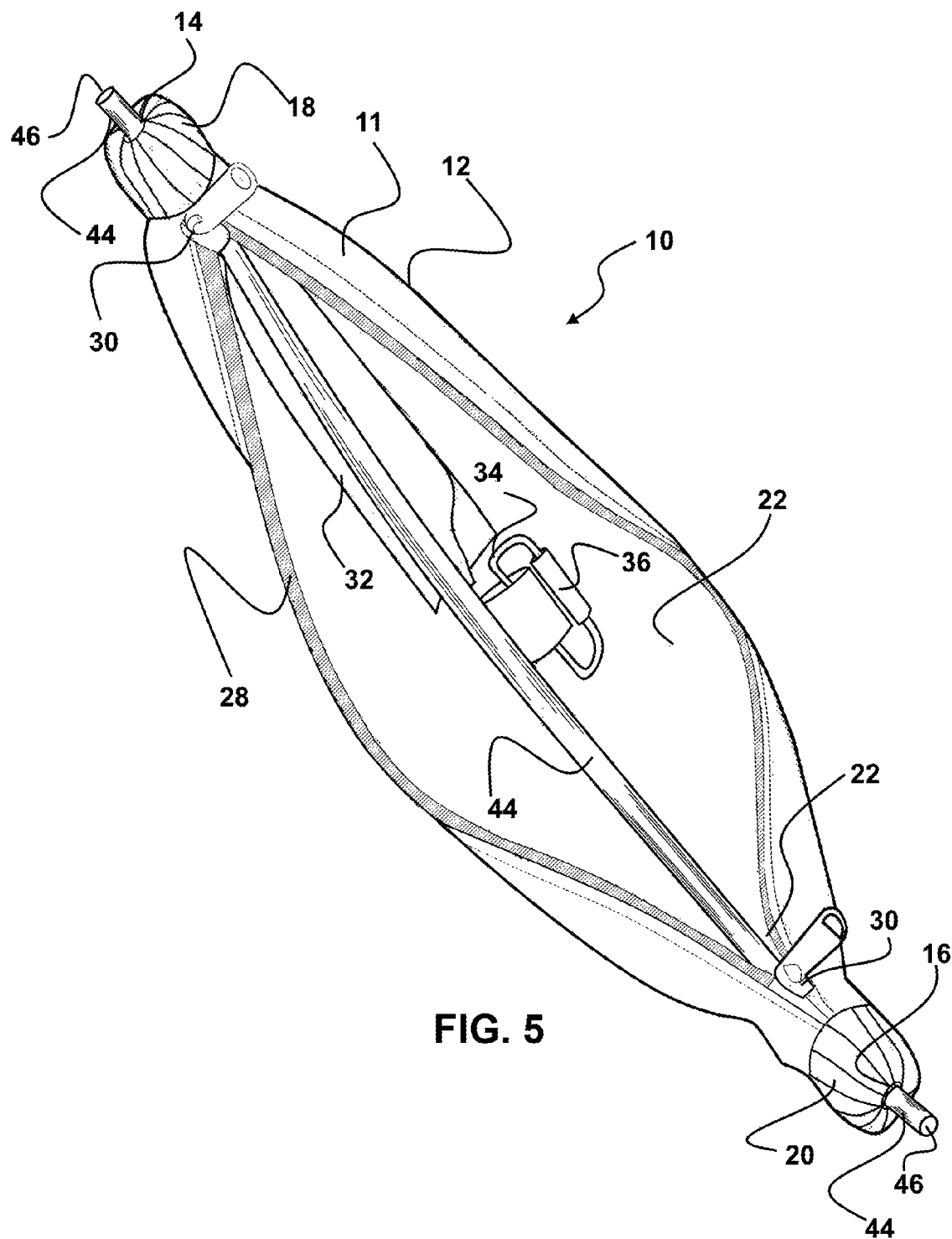
FIG. 5 depicts the leash engageable container herein showing the flexible conduit communicating through the interior cavity providing the leash pathway for a leash between opposing compressed first and second passages at opposing ends.

FIG. 5 depicts the leash engageable container device 10 herein showing the flexible conduit 44 with the axial passage 46 communicating through the interior cavity 22. As noted, with the flexible conduit 44 included, the leash pathway for a leash between the opposing compressed first passage 14 and second passage 16 at the opposite end of the body 12 is further confined within the axial passage 46 of the flexible conduit 44.

Figure 6:
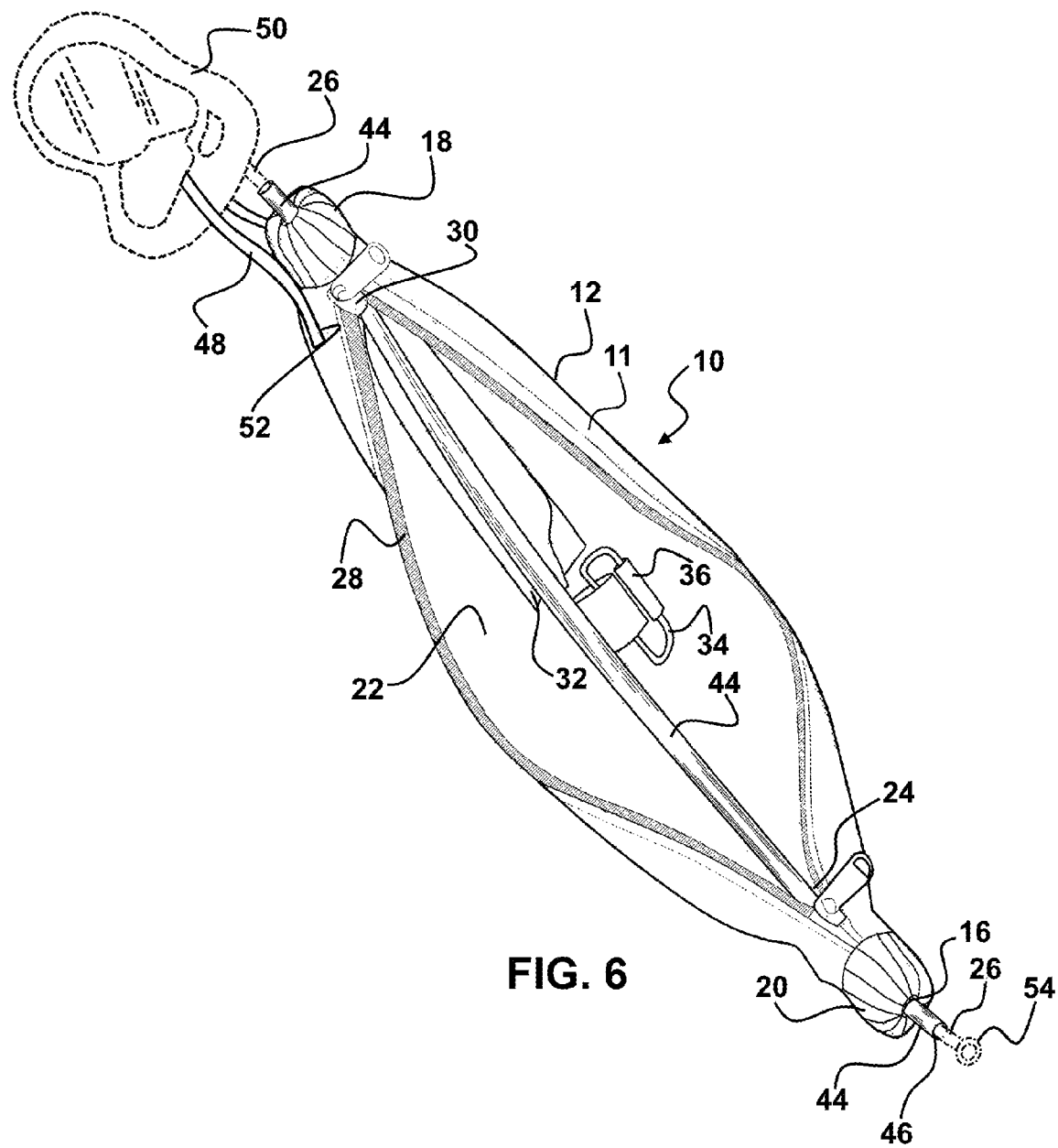
FIG. 6 depicts the leash engageable container of FIG. 4 showing the flexible conduit communicating through the interior cavity providing the leash pathway for a leash between opposing compressed first and second passages at opposing ends and showing the strap configured for removable engagement to a leash handle.

FIG. 6 depicts the leash engageable container device 10 as shown in FIGS. 4 and 5, showing the flexible conduit 44 communicating through the interior cavity 22 and confining the leash pathway through the interior cavity 22 between the first and second passages, within the axial passage 46. Easy access to the interior cavity 22 with the body 12 having the strap 48 connected to a leash handle 50 is provided by the closure 28 such as a zipper 30 being opened, while a leash 26 runs along the leash pathway from the leash handle 50 at one end to an engagement with a connector 54 adapted to engage a collar or vest or other item operatively positioned on a pet such as a dog. The pocket 32 as shown is accessible through the second opening 25 on the opposite side of the body 12 such as shown in FIG. 3.

While the present invention has been described herein with reference to particular embodiments thereof, a latitude of modifications, various changes and substitutions are intended in the foregoing disclosures, it will be appreciated that in some instance some features, or configurations, of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

Further, the purpose of any abstract included with this specification is to enable the U.S. Patent and Trademark Office, the public generally, and especially the scientists, engineers, and practitioners in the art who are not familiar with patent or legal terms or phraseology, to determine quickly from a cursory inspection the nature and essence of the technical disclosure of the application. Any such abstract is neither intended to define the invention of the application, which is measured by the claims, nor is it intended to be limiting, as to the scope of the invention in any way.

What is claimed is:

1. A leash engageable carrier apparatus comprising:
   a sidewall defining a cylindrical body, said sidewall surrounding an interior cavity of said body;
   a first biased portion of said sidewall at a first end of said body, said first biased portion contracting said sidewall around a perimeter of a first passage at said first end of said body;
   a second biased portion of said sidewall at a second end of said body, said second biased portion contracting said sidewall around a perimeter of a second passage at said second end of said body;
   a first opening communicating through said sidewall with said interior cavity, said first opening closeable with a closure operatively engaged therewith;
   said body adapted for an engagement with a leash communicating along a leash pathway, said leash pathway running through said first passage and across said interior cavity and through said second passage;
   said body in said engagement with said leash, slideable to an engaged position thereon;
   said interior cavity accessible through said first opening with said body in said engagement with said leash, whereby said interior cavity is adapted for storage of personal items of a user therein while in said engagement with said leash; a conduit communicating across said interior cavity between said first opening and said second opening; and said conduit having an axial passage surrounding said leash pathway.

2. The leash engageable carrier apparatus of claim 1 wherein said body is held in said engaged position by a biased contact with said leash of both said sidewall around said perimeter of said first passage and said sidewall around said perimeter of said second passage.

3. The leash engageable carrier apparatus of claim 1 additionally comprising:
   a connector mounted to said sidewall within said interior cavity, said connector adapted to removably engage with said personal items.

4. The leash engageable carrier apparatus of claim 2 additionally comprising:
   a connector mounted to said sidewall within said interior cavity, said connector adapted to removably engage with said personal items.

5. The leash engageable carrier apparatus of claim 1 additionally comprising:
   a strap engaged at a first end thereof to said sidewall of said body;
   said strap adapted to engage with a leash handle connected to said leash and hold said body in said engaged position; and
   a connector for removably engaging a second end of said strap to said body.

6. The leash engageable carrier apparatus of claim 1 additionally comprising:
   a pocket positioned within said interior cavity; and
   said pocket accessible through a second opening in said sidewall.

* * * * *